(12) United States Patent
Choi

(10) Patent No.: US 10,391,883 B2
(45) Date of Patent: Aug. 27, 2019

(54) APPARATUS AND METHOD FOR REMOTELY CONTROLLING FUEL CELL ELECTRIC VEHICLE

(71) Applicants: HYUNDAI MOTOR COMPANY, Seoul (KR); KIA MOTORS CORPORATION, Seoul (KR)

(72) Inventor: Hyunwoo Choi, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 32 days.

(21) Appl. No.: 15/665,945

(22) Filed: Aug. 1, 2017

(65) Prior Publication Data

US 2018/0118050 A1 May 3, 2018

(30) Foreign Application Priority Data

Oct. 28, 2016 (KR) .................. 10-2016-0141996

(51) Int. Cl.
| | |
|---|---|
| *B60R 25/00* | (2013.01) |
| *F02N 11/00* | (2006.01) |
| *F02N 11/08* | (2006.01) |
| *B60L 11/18* | (2006.01) |
| *G05D 1/00* | (2006.01) |
| *B60L 58/31* | (2019.01) |

(Continued)

(52) U.S. Cl.
CPC .......... *B60L 11/1885* (2013.01); *B60L 58/31* (2019.02); *B60L 58/34* (2019.02); *B60L 58/40* (2019.02); *G05D 1/0022* (2013.01); *B60L 2240/36* (2013.01); *B60L 2240/80* (2013.01); *B60L 2260/20* (2013.01); *Y02T 90/16* (2013.01); *Y02T 90/34* (2013.01)

(58) Field of Classification Search
CPC .................. B60L 11/1888; G05D 1/0022
USPC ................................................. 701/2
See application file for complete search history.

(56) References Cited

U.S. PATENT DOCUMENTS

2013/0073121 A1* 3/2013 Kim ................ B60R 25/209
701/2
2014/0170514 A1* 6/2014 Harris ............. H01M 8/04223
429/429

FOREIGN PATENT DOCUMENTS

| JP | H10-227273 A | 8/1998 |
|---|---|---|
| JP | 2011-47313 A | 3/2011 |
| JP | 2016-506225 A | 2/2016 |

(Continued)

OTHER PUBLICATIONS

Korean Office Action issued in Application No. 10-2016-0141996 dated Jun. 17, 2018.

(Continued)

*Primary Examiner* — Adam D Tissot
(74) *Attorney, Agent, or Firm* — Morgan Lewis & Bockius LLP

(57) ABSTRACT

A method for remote start control of a hydrogen fuel cell vehicle includes receiving a remote start command via a wireless communication network, transmitting a start signal corresponding to the remote start command through an in-vehicle network, transmitting a start mode in response to the start signal, determining a response waiting time corresponding to the start mode, receiving an operation result of the start signal through the in-vehicle network during the response waiting time, and transmitting the operation result over the wireless communication network.

20 Claims, 5 Drawing Sheets

(51) Int. Cl.
*B60L 58/40* (2019.01)
*B60L 58/34* (2019.01)

(56) References Cited

FOREIGN PATENT DOCUMENTS

| KR | 10-2011-0062627 A | 6/2011 |
| KR | 10-2016-0056714 A | 5/2016 |

OTHER PUBLICATIONS

Notice of Allowance issued in Korean Application No. 10-2016-0141996 dated Nov. 27, 2018.

* cited by examiner

APPARATUS AND METHOD FOR REMOTELY CONTROLLING FUEL CELL ELECTRIC VEHICLE

CROSS-REFERENCE TO RELATED APPLICATION

This application claims the benefit of priority to Korean Patent Application No. 10-2016-0141996, filed Oct. 28, 2016 in the Korean Intellectual Property Office, the disclosure of which is hereby incorporated by reference as if fully set forth herein.

TECHNICAL FIELD

The disclosure relates to a remote control method and apparatus for a fuel cell electric vehicle, and more particularly, to a remote control method and apparatus which are distinguishable through an appropriate operation based on fuel cell characteristics to increase the user convenience.

BACKGROUND

Hybrid vehicles and electric vehicles are well known to people as eco-friendly vehicles. Typically, a hybrid vehicle is considered as a vehicle having two or more power sources such as an engine and a motor, and an electric vehicle is considered as a vehicle using a battery only.

A hybrid vehicle can generate electricity while the vehicle is running so to charge a battery equipped in the vehicle. Then, the hybrid vehicle transforms stored electrical energy into a motive power for driving. In particular, a hybrid vehicle uses a regenerative braking system to convert the kinetic energy of an electric motor, which rotates in a reverse direction when the vehicle decelerates, into electrical energy. The hybrid vehicle can store the electrical energy into a battery, and uses stored energy during driving in order to increase fuel energy efficiency.

An electric vehicle (EV) uses a high-voltage battery instead of a fossil fuel as well as a motor instead of an engine. The major feature of EVs is that they have a charging operation, which is different from conventional vehicles including an internal combustion engine. A charging system for charging a battery equipped in the vehicle can be implemented in various forms.

As an eco-friendly automobile, there is an electric vehicle as well as a fuel cell electric vehicle (FCEV or FCV) which operates an electric motor by using electrical energy generated by reacting stored hydrogen with oxygen in the air. Because the FCV uses electrical energy generated by reacting hydrogen and oxygen, the FCV may discharge water instead of exhaust gas so that it could be recognized by people as a pollution-free vehicle. Since electric vehicles cannot produce electricity by themselves, they should be charged at a charging facility or a charging station. However, fuel cell vehicles can produce electricity by themselves, so they do not have to be charged with electrical energy at the charging facility or a charging station. The time for injecting hydrogen into the FCV would be not much different from the time for injecting conventional fossil fuels (e.g., gasoline, diesel) into a vehicle, so that the user convenience can be improved.

SUMMARY

According to an aspect of the present disclosure, a situation, in which a remote start control fails due to a difference between starting times at a cold start condition and a normal start condition in a fuel cell electrical vehicle (FCEV or FCV), can be avoided, and an apparatus and a method for enabling remote start control based on a start condition are provided.

Further, the present disclosure provides an apparatus and a method for remotely controlling an operation of a vehicle in response to an expected time required according to an operating condition of a vehicle in order to enhance the mobility of the vehicle and improve user convenience.

A method for remote start control of a hydrogen fuel cell vehicle according to an exemplary embodiment of the present disclosure may include: receiving, by a telematics terminal a remote start command via a wireless communication network; transmitting, by a vehicle controller, a start signal corresponding to the remote start command through an in-vehicle network; transmitting, by a telematics terminal a start mode in response to the start signal; determining, by a telematics terminal a response waiting time corresponding to the start mode; receiving, by a telematics terminal an operation result of the start signal through the in-vehicle network during the response waiting time; and transmitting, by a telematics terminal the operation result over the wireless communication network.

The start mode can include a normal start mode and a cold start mode. In the cold start mode, an in-vehicle motor is driven under a condition that a temperature in a fuel cell of the hydrogen fuel cell vehicle is equal to or lower than a predetermined temperature. In the normal startup mode, the in-vehicle motor is driven under a condition that the temperature in the fuel cell exceeds the predetermined temperature.

The predetermined temperature may be 30 degrees below zero Celsius (° C.).

The response waiting time in the normal startup mode may be 30 seconds, while the response waiting time in the cold start mode may be one minute.

The start signal can be transmitted at least twice in a predetermined cycle during the response waiting time.

The predetermined cycle may be ranged in 10 seconds to 20 seconds.

The method can further include determining delivery cycle of the start signal according to the start mode.

According to the start mode, a preparation time for driving a motor equipped in a vehicle differs.

The remote start command can be transmitted from a telematics server coupled through the wireless communication network.

The start signal can be transmitted from a telematics terminal equipped, in the vehicle into a vehicle controller through a controller area network (CAN). The start mode may be transmitted from the vehicle controller into the telematics terminal via the controller area network (CAN).

An apparatus for remote start control of a hydrogen fuel cell vehicle according to an exemplary embodiment of the present disclosure may be engaged with a mobile device or a network server. The apparatus can include a processing system that comprises at least one data processor and at least one computer-readable memory storing a computer program. Herein, the processing system is configured to cause the apparatus to receive a remote start command via a wireless communication network, transmit a start signal corresponding to the remote start command through an in-vehicle network, transmit a start mode in response to the start signal, determine a response waiting time corresponding to the start mode, receive an operation result of the start signal through the in-vehicle network during the response waiting time, and transmit the operation result over the wireless communication network.

An apparatus for remote control of a hydrogen fuel cell vehicle according to an exemplary embodiment of the present disclosure may include a telematics terminal for receiving a remote start command via a wireless communication network and transmitting a art signal corresponding to the remote start command through an in-vehicle network and a vehicle controller for transmitting a start mode to the telematics terminal in response to the start signal. Herein, the telematics terminal can determine a response waiting time corresponding to the start mode, receive an operating result of the start signal through the in-vehicle network during the response waiting time, and transmit the operation result over the wireless communication network.

The start mode may include a normal start mode and a cold start mode. In the cold start mode, an in-vehicle motor is driven under a condition that a temperature in a fuel cell equipped in the hydrogen fuel cell vehicle is equal to or lower than a predetermined temperature, while, in the normal startup mode, the in-vehicle motor is driven under condition that the temperature in the fuel cell exceeds the predetermined temperature.

The predetermined temperature may be 30 degrees below zero Celsius (° C.).

The response waiting time in the normal startup mode may be 30 seconds, while the response waiting time in the cold start mode may be one minute.

The start signal can be transmitted at least twice in a predetermined cycle during the response waiting time.

The predetermined cycle can be ranged in 10 seconds to 20 seconds.

The telematics terminal can determine a delivery cycle of the start signal according to the start mode.

According to the start mode, a preparation time for driving a motor equipped in a vehicle differs.

The start signal and the start mode are delivered via a Controller Area Network (CAN).

Advantages, objects, and features of the present disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Figure 1:
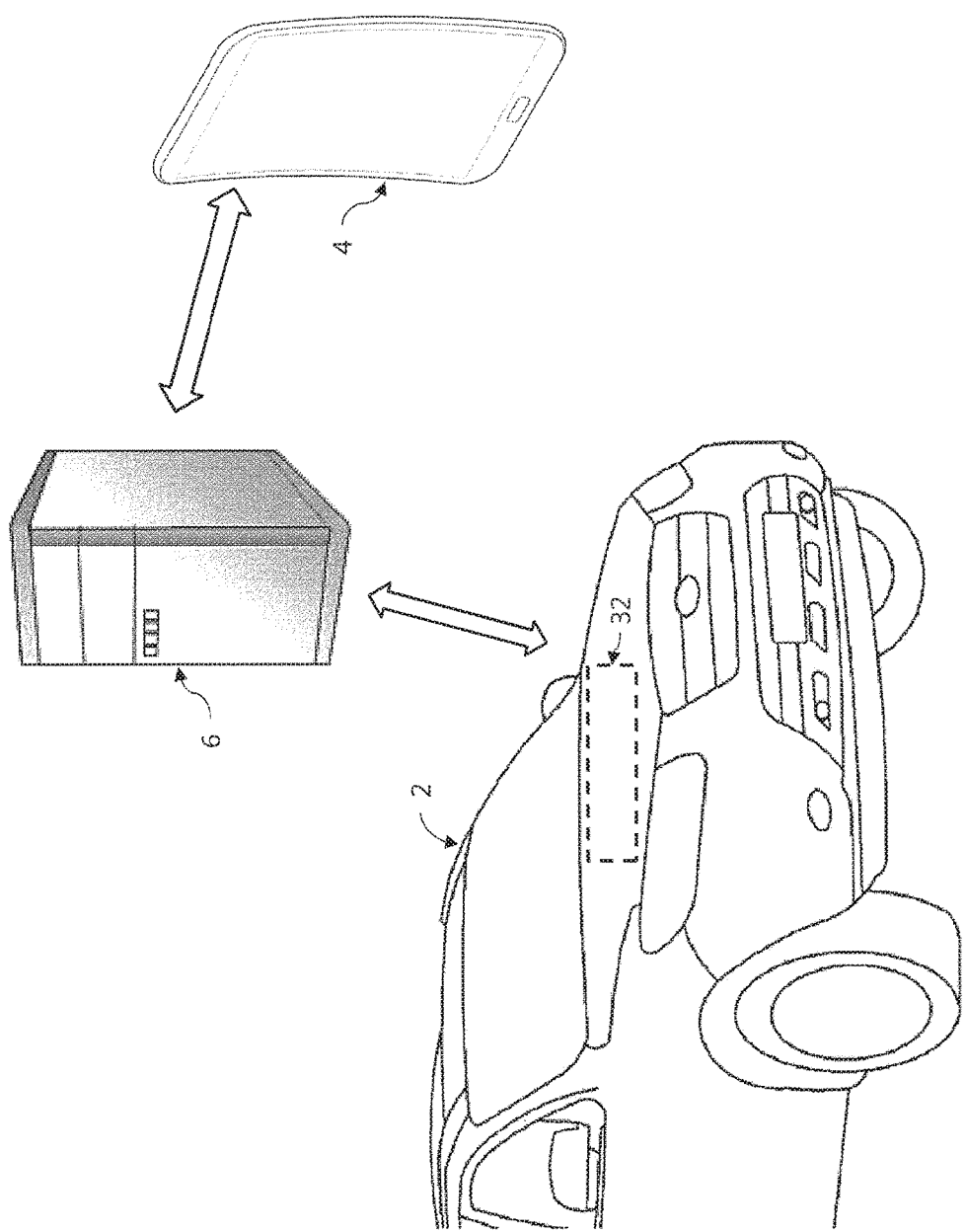
FIG. 1 shows a system for remote start control of hydrogen fuel cell vehicle according to an exemplary embodiment of the present disclosure.

Reference will now be made in detail to the exemplary embodiments of the present disclosure, examples of which are illustrated in the accompanying drawings. In the drawings, the same elements are denoted by the same reference numerals, and a repeated explanation thereof will not be given. The suffixes "module" and "unit." of elements herein are used for convenience of description and thus can be used changeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the present disclosure, certain detailed explanations of related art are omitted when it is deemed that they may unnecessarily obscure the essence of the present disclosure. The features of the present disclosure will be more clearly understood from the accompanying drawings and should not be limited by the accompanying drawings. It is to be appreciated that all changes, equivalents, and substitutes that do not depart from the spirit and technical scope of the present disclosure are encompassed in the present disclosure.

A fuel cell vehicle can include an automobile that uses an electrical energy produced from a fuel cell to run a motor for driving, replacing an engine functioned as a power conversion device of an internal combustion engine vehicle with a fuel cell. For example, a hydrogen fuel cell vehicle is a kind of electric vehicle driven by electricity produced from a fuel cell. Fuel cells can obtain electricity directly by the electrochemical reaction of hydrogen and oxygen.

The fuel cell vehicle can include a fuel cell stack corresponding to an engine, various operation devices (such as hydrogen and air supply system, water and thermal management system, etc.) required for optimum operation of the fuel cell, a hydrogen storage device, a power conversion device, driving system (such as a motor, decelerator, etc.), and a control device for controlling them. For example, among plural different fuel cells, a polymer electrolyte membrain fuel cell (PEMFC) may be mainly used as fuel cells for means of transportation. A basic fuel for producing energy is hydrogen. Besides hydrogen, in order to use another fuels such as a methanol, a gasoline, a diesel or a natural gas, the fuel cell vehicle should be equipped with separate fuel converters to produce hydrogen from these fuels.

The structure from an in-vehicle motor to wheels of a fuel cell vehicle can be similar to that of a conventional electric vehicle. However, unlike a conventional electric vehicle, the fuel cell vehicle does not use stored electric power, but instead make electricity to drive the motor while the vehicle is running. However, the fuel cell alone may not produce electricity. The fuel cells are equipped in the vehicle with peripheral devices (Balance of Plant, BOP), which are necessary for supporting the operation of the fuel cell. These devices supply a necessary amount of fuel and air into the fuel cell. Cooling system such as cooling water is also needed to maintain adequate temperature. Such a fuel cell and a peripheral device necessary for driving the fuel cell may be collectively referred to as a fuel cell system.

Hereinafter, a hydrogen fuel cell vehicle will be described as an example of a fuel cell vehicle.

FIG. 1 shows a system for remote start control of a hydrogen fuel cell vehicle.

As shown, the telematics terminal 32 equipped in the hydrogen fuel cell vehicle 2 can be coupled with the network server 6 through a wireless communication technology. Further, the telematics terminal 32 can be coupled with a portable communication device 4 (e.g., a mobile device) through a short-range wireless communication technology or a wireless communication technology.

The network server 6 is a sort of network device operated to support a telematics technology equipped in the hydrogen fuel cell vehicle 2, and can store unique information of the vehicle, driving information of the vehicle, and the like. The network server 6 can engage with the vehicle while the vehicle runs or before/after the vehicle runs through the wireless communication network. Further, the network server 6 can store information set by a driver (or a user) and can help or assist the driver (or the user) to manipulate a device or a function associated with driving and safety of vehicle. In particular, it is possible to set the driver or the user to turn on (e.g., start) the hydrogen fuel cell vehicle 2 via the portable communication device 4 and the network server 6 even when the driver or the user does not have a vehicle key. Further, it is possible that the hydrogen fuel cell vehicle 2 cannot be turned on (e.g., started) if the driver or the user does not want to do.

The portable communication device 4 may be a smart phone or the like that the driver (or the user) can carry. The portable communication device 4 can interoperate with the hydrogen fuel cell vehicle 2 or the network server 6 through the wireless communication technology or a local wireless communication technology. The portable communication device 4 can store or acquire the unique information of the fuel cell vehicle 2 or personal information of the driver or the user.

Figure 2:
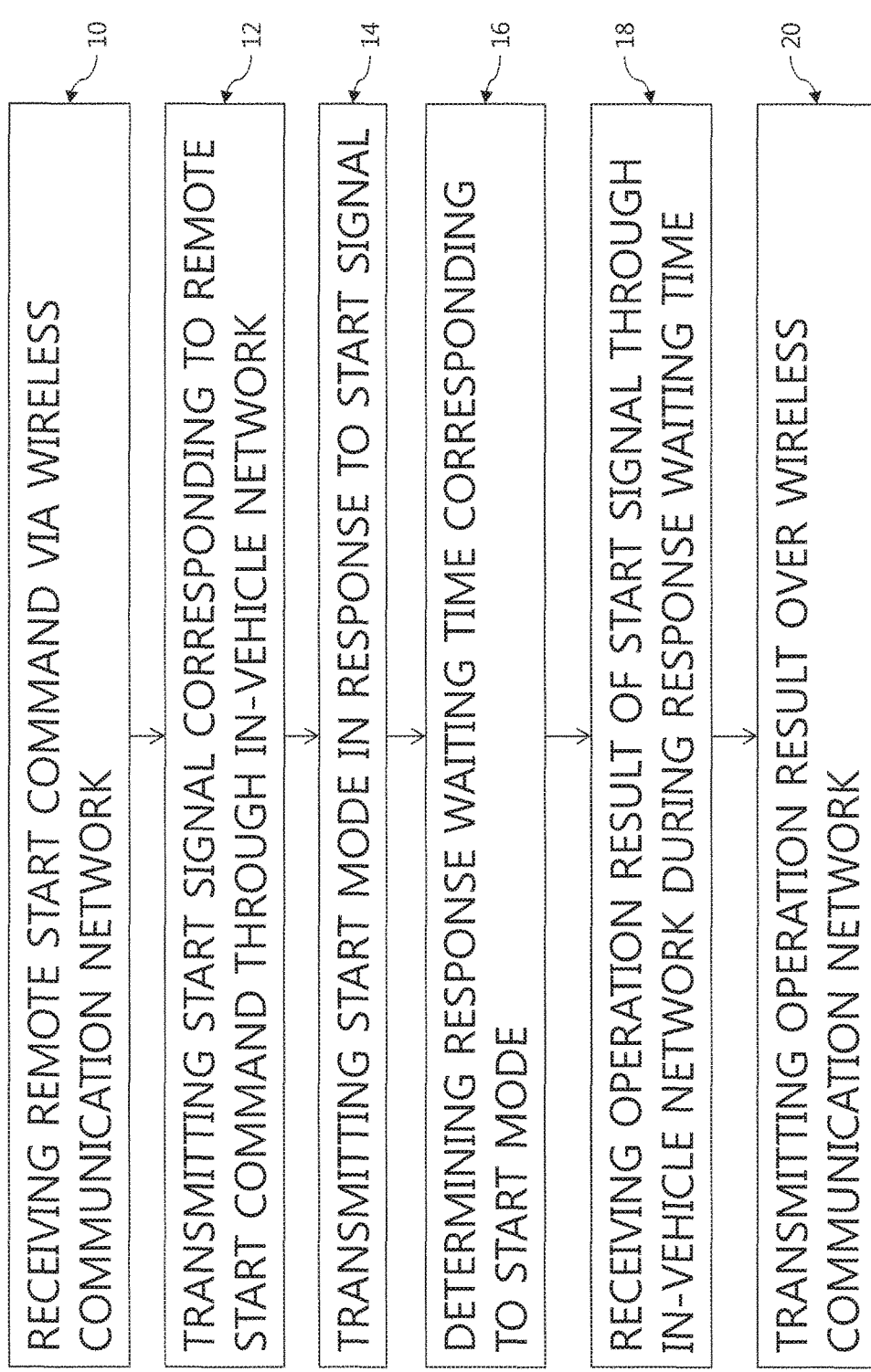
FIG. 2 describes a remote start control method of a hydrogen fuel cell vehicle according to an exemplary embodiment of the present disclosure.

FIG. 2 describes a remote start control method of a hydrogen fuel cell vehicle.

As shown, a method for remotely controlling a hydrogen fuel cell vehicle can include receiving a remote start command via a wireless communication network (10), transmitting a start signal corresponding to a remote start command via an in-vehicle network (20), receiving a start mode in response to the start signal (14), determining a response waiting time corresponding to the start mode (16), receiving an operation result of start signal over the in-vehicle network during the response waiting time (18), and transmitting the operation result over the wireless communication network (20).

Here, the remote start command may be transmitted from the telematics server connected through the wireless communication network. In addition, the start signal can be transmitted from the telematics terminal equipped in the vehicle to a vehicle controller via a controller area network (CAN), while the start mode can be transmitted from the vehicle controller to the telematics terminal via the CAN.

A fuel cell stack equipped in a hydrogen fuel cell vehicle can include plural unit cells arranged in series. Each unit cell can include a membrane-electrode assembly (MEA) innermostly. The membrane-electrode assembly (MEA) can include an electrolyte membrane capable of moving hydrogen ions (e.g., proton) and a catalyst layer, i.e., so-called cathode and anode, coated on both sides of the electrolyte membrane so that hydrogen and oxygen can react with each other. When the vehicle is turned off, the fuel cell stack should remove water generated in the membrane electrode assembly (MEA) so as to provide stability to the oxidation and reduction reactions at the next start, thereby securing stable start-ability (stable start of the vehicle). When the vehicle is exposed at a subzero Celsius temperature for a long time, the water produced in the membrane-electrode assembly (MEA) by the electrochemical reaction can freeze on the anode and cathode surfaces of the membrane-electrode assembly (MEA). For this reason, unlike other types of vehicles, a hydrogen fuel cell vehicle may have a normal start mode and a cold start mode.

In the cold start mode, the motor can be driven under the condition that a temperature in the fuel cell equipped in the hydrogen fuel cell vehicle is equal to or lower than a predetermined temperature, while the motor under the normal start mode can be driven under the condition that a temperature in the fuel cell exceeds the predetermined temperature. Here, by the way of example but not limitation, the predetermined temperature may be minus 30° C., i.e., 30 degrees below zero Celsius (° C.).

In a hydrogen fuel cell vehicle, a power unit is an electric motor, but hydrogen is used as a fuel. Due to the characteristics of hydrogen, a longer preparation time for driving an electric motor could be required at a certain temperature or lower. This causes a difference between start times of the cold start mode and the normal start mode. The start time of the motor equipped in the vehicle may differ depending on the start mode, which may have a different preparation time. As a result, a remote start control may fail under a certain temperature, such as in the cold start mode, in the same way as a normal start mode or a case when a conventional vehicle starts. In the case of a remote start control of telematics services, a response waiting time may vary depending on the normal start mode and the cold start mode, and thus a method for setting the response waiting time efficiently and actively is needed. By the way of example but not limitation, the response waiting time in the normal startup mode may be 30 seconds, while the response waiting time in the cold start mode may be one minute.

The user or the driver can transmit a remote start command into the telematics server through a smartphone or a mobile device, and a telematics server can deliver the remote start command into the telematics terminal equipped in the hydrogen fuel cell vehicle. The telematics terminal may transmit an instruction corresponding to the remote start command into a controlling device (such as a controller) that can manage vehicle's start (turn-on), and then the telematics terminal can wait for a predetermined response waiting time set for a remote start control. If an operation result might be received within this response waiting time, the operation result can be delivered back to user's or driver's smartphone. During the response waiting time, a start signal with a predetermined cycle may be transmitted at least twice. Here, by the way of example but not limitation, the predetermined cycle may be ranged in 10 seconds to 20 seconds. For example, in the case of the normal start mode, the response waiting time can be set to 30 seconds, in which three remote start commands sent every 10 seconds. Because a success or failure of start operation can be determined within a maximum of 10 seconds, the 30 seconds can support a total of three attempts of remote start command, including a retry. Further, the response waiting time could be limited to 30 seconds that the user or the driver who sent the remote control commend does not wait too long for a response to his or her request for the remote start control. Also, though not shown, the remote control method of the fuel cell vehicle may further include determining a delivery period of the start signal according to the start mode.

Figure 3:
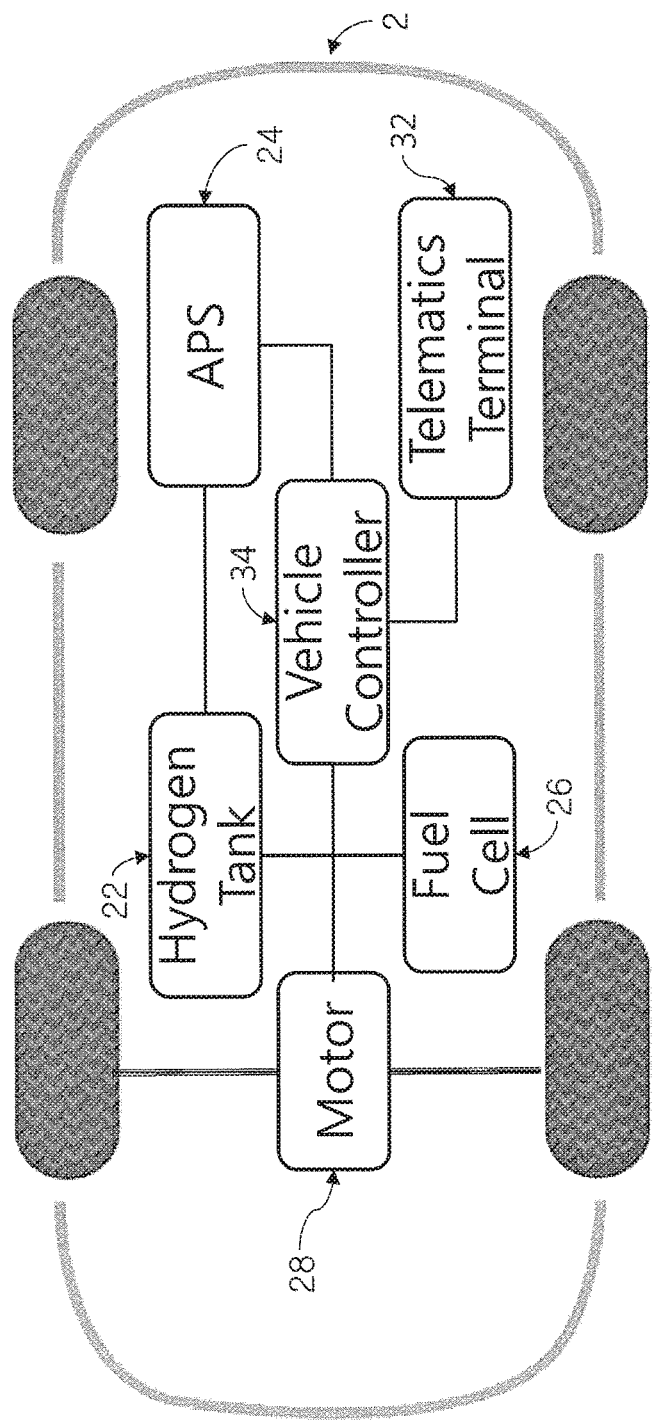
FIG. 3 shows a hydrogen fuel cell vehicle according to an exemplary embodiment of the present disclosure.

FIG. 3 shows a hydrogen fuel cell vehicle.

As shown, the hydrogen fuel cell vehicle 2 may include a motor 28 corresponding to an engine equipped in a conventional automobile, a fuel cell 26, and a hydrogen tank 22.

The fuel cell 26 may include a fuel cell stack, and may be engaged with an operation unit for managing hydrogen, air, and water. Here, the fuel cell stack includes a membrane-electrode assembly (MEA), a sort of apparatus that generates electricity by reacting the hydrogen and oxygen meeting, that uses a porous carbon membrane to facilitate diffusion of the gas and facilitate contact with the catalyst layer, and a separator (bipolar plate) that serves as a passage for supplying fuel and air as well as discharging electricity to an external circuit.

The operation unit supplies and controls hydrogen and air to the fuel cell stack and removes water and heat generated in the fuel cell stack. The operation unit can include an air process system (APS) 24, a thermal (and water) management system (TMS) and a fuel process system (FPS). Herein, the air process unit (APS) 24 is a system for supplying air (oxygen) to react with hydrogen stored in the fuel cell stack, and may include an air cleaner, an air blower or an air compressor, and the like. As not shown, the thermal (and water) management system (TMS) can have a function of maintaining the water balance required in the overall system. The thermal (and water) management system (TMS) maintains the fuel cell stack at a suitable temperature even though the fuel cell stack generates heat in the reaction of hydrogen and oxygen. The thermal (and water) management system (TMS) may include a radiator, a water pump, an ion eliminator, a water tank, and the like. In addition, the hydrogen supply system (FPS) is a system for supplying hydrogen to the fuel cell stack, and may include a hydrogen tank, a pressure controller, a hydrogen circulator, and the like.

The hydrogen tank 22 is a device for storing hydrogen as a fuel and controlling a pressure of hydrogen, and may include a hydrogen tank, a pressure regulating valve, a tank built-in solenoid valve, a pressure sensor, a hydrogen sensor, and etc.

As not shown, the hydrogen fuel cell vehicle 2 may further include an electric device. The electric device can include an inverter (converter) for converting a DC voltage outputted from the fuel cell stack of the fuel cell 26 into an AC voltage, a secondary battery and/or a capacitor for regenerating electricity from vehicle brakes. The secondary battery and the capacitor can be used as an auxiliary power source to increase a durability life of the fuel cell stack in the fuel cell 26, and to improve a mileage and a fuel efficiency.

The operation of the motor 28, the fuel cell 26, the hydrogen tank 22, and the like may be controlled by the vehicle controller 34. Herein, the vehicle controller 34 is a kind of computing device equipped in the vehicle, which can control the operation of the motor 28 in the hydrogen fuel cell vehicle 2 so as to manage vehicle performance such as a driving performance of the vehicle, a fuel efficiency (energy efficiency), and the like. The vehicle controller 34 can control the motor 28 so that the vehicle can move more accurately reflecting the intention of the user or the driver.

The remote control device of the fuel cell vehicle 2 can include a telematics terminal 32 for receiving a remote start command via a wireless communication network and then transmitting a start signal corresponding to the remote start command through an in-vehicle network and a vehicle controller 34 for transmitting a start mode corresponding to the start signal to the telematics terminal 32. Herein, the telematics terminal 32 can determine a response waiting time in response to the start mode, receive an operation result of the start signal during the response waiting time through the in-vehicle network, and delivery the operation result over the wireless communication network.

The start mode transmitted from the vehicle controller 4 may include a normal start mode and a cold start mode. In the cold start mode, the motor 28 can be driven under a condition that a temperature in the fuel cell 26 equipped in the fuel cell vehicle 2 is equal to or lower than a predetermined temperature. In the normal start mode, the motor 28 can be driven under another condition that the temperature in the fuel cell 26 equipped in the fuel cell vehicle 2 is higher than the predetermined temperature. Herein, the predetermined temperature may be minus 30° C.

The response waiting time for the telematics terminal 32 receive the operation result (regarding vehicle start) from the vehicle controller 34 may be changed according to the start mode. By the way of example but not limitation, the response waiting time in normal start mode may be 30 seconds, while the response waiting time in cold start mode may be one minute. This is because the preparation time for driving the motor 28 varies depending on the start mode.

The telematics terminal 32 can transmit the start signal to the vehicle controller 34 at least twice at a predetermined cycle during the response waiting time. At this time, the predetermined cycle may be 10 seconds to 20 seconds. Further, according to the start mode, the telematics terminal 32 may determine the predetermined cycle for transmitting the start signal.

Communication between the vehicle controller 34 and the telematics terminal 32 is performed via a controller area network (CAN), and the start signal and the start mode are transmitted in a form of a frame (or a message) used in the controller area network.

Further, according to embodiments, the telematics terminal 32 and/or the vehicle controller 34 can include a processing system that comprises at least one data processor and at least one computer-readable memory storing a computer program.

Figure 4:
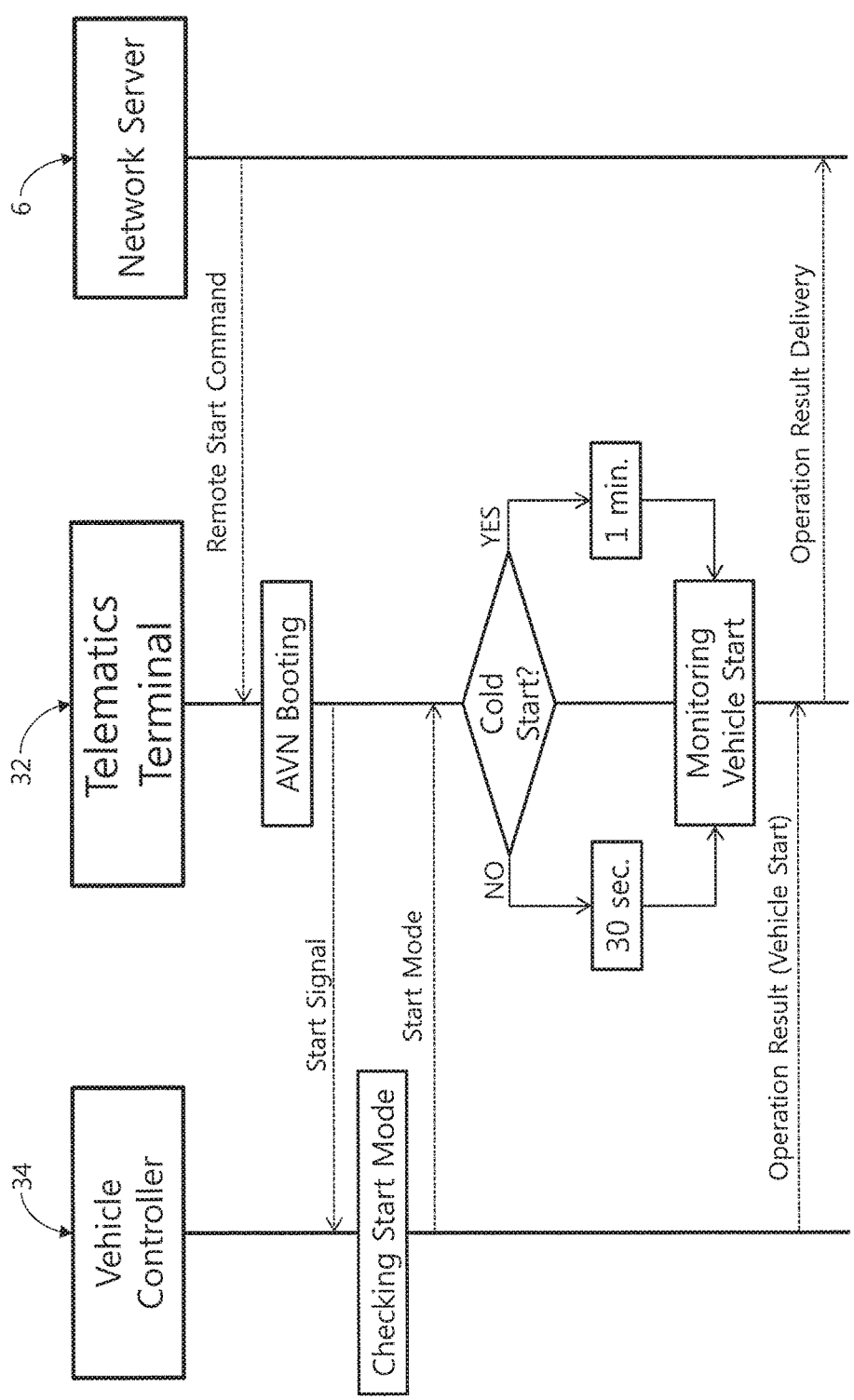
FIG. 4 is a flowchart illustrating a process of remotely starting and controlling a hydrogen fuel cell vehicle according to an exemplary embodiment of the present disclosure.

FIG. 4 is a flowchart illustrating a process of remotely starting and controlling a hydrogen fuel cell vehicle.

As shown, a remote start control process begins with a remote start command which is transmitted from the network server 6 to the telematics terminal 32 equipped in the hydrogen fuel cell vehicle. The telematics terminal 32 that has received the remote start command can activate (or boot) associated devices. Herein, the telematics terminal 32 may be a vehicle-mounted multimedia system (such as an audio-video-navigation (AVN) system) or may be a device equipped separately from the vehicle-mounted multimedia system.

The telematics terminal 32 transmits a start signal to the vehicle controller 34 in response to the received remote start command. The vehicle controller 34 can inform the telematics terminal 32 of the start mode of the hydrogen fuel cell vehicle in response to the start signal. The vehicle controller 34 can monitor an internal temperature of the fuel cell mounted on the hydrogen fuel cell vehicle in order to recognize the start mode.

Upon receiving the start mode corresponding to the temperature condition, the telematics terminal 32 can actively or efficiently set up the response waiting time for the remote start control. By the way of example but not limitation, the response waiting time is set to about 30 seconds in the case of the normal start mode and about 1 minute in the case of the cold start mode. After waiting for the operation result (success or failure of vehicle start), the telematics terminal 32 can transmit the operation result to user's mobile device or portable terminal through the network server 6.

Figure 5:
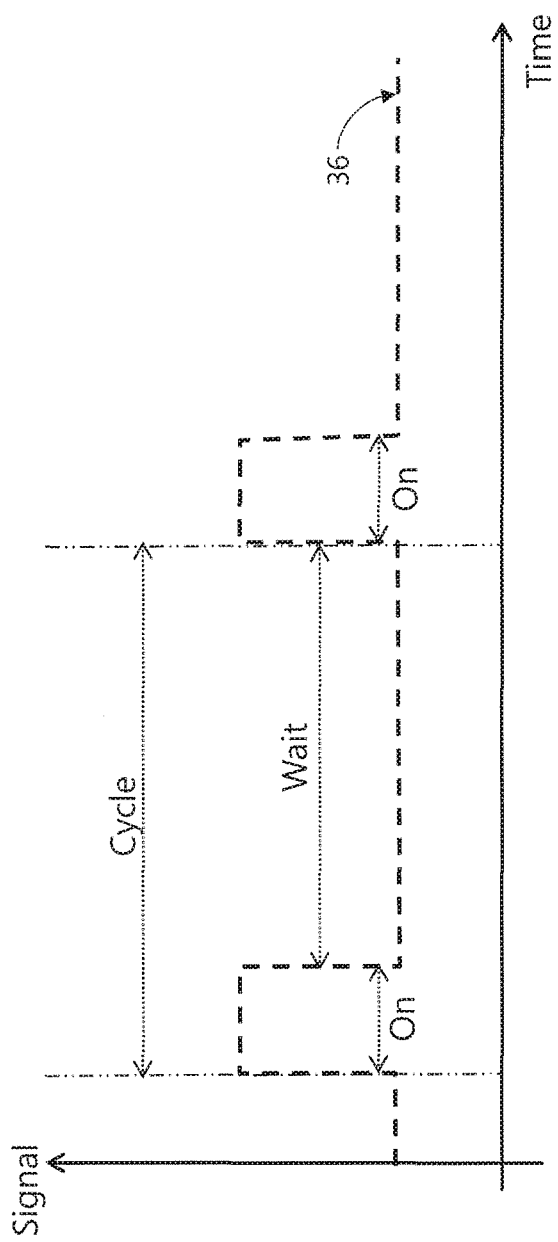
FIG. 5 is a graph describing a method of transmitting and receiving a start signal and whether or not to start according to an exemplary embodiment of the present disclosure.

FIG. 5 is a graph describing a method of transmitting and receiving a start, signal and whether or not to start.

As shown, the start signal 36 transmitted to the vehicle controller 34 by the telematics terminal 32 may have a predetermined cycle (e.g., 10 seconds). The start signal 36 may be activated for a certain period of time and then deactivated while the telematics terminal 32 waits for receiving an operation result regarding vehicle start for a certain period of time.

According to embodiments, the period of the start signal 36 may vary depending on the start mode delivered from the vehicle controller 34.

As above described, the disclosure can reduce a failure rate of the remote control by performing the remote control, requested by a user, in response to an operating condition or environment of a hydrogen fuel cell vehicle even when the time required for the operation varies depending on the operating condition or the environment of the hydrogen fuel cell vehicle.

In addition, since the disclosure can provide a remote control method and apparatus which can actively handle the hydrogen fuel cell vehicle according to an operating condition or environment of the hydrogen fuel cell vehicle, it is not necessary for a user or a driver to set up or manipulate the hydrogen fuel cell vehicle in accordance with the condition or the environment so that the convenience of the user or the driver can be increased or improved.

The aforementioned embodiments are achieved in a predetermined manner. Each of the structural combination of structural elements and features of the elements or features can be considered selectively unless specified separately. Each of the structural elements or features may be carried out without being combined with other structural elements or features. Some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the present disclosure without departing from the spirit or scope. Thus, it is intended that the present disclosure covers the modifications and variations of this present disclosure provided they come within the scope of the appended claims and their equivalents.

What is claimed is:

1. A method for remote, start control of a hydrogen fuel cell vehicle, the method comprising steps of:
    receiving, by a telematics terminal, a remote start command via a wireless communication network;
    transmitting, by the telematics terminal, a start signal corresponding to the remote start command through an in-vehicle network;
    transmitting, by a vehicle controller, a start mode in response to the start signal;
    determining, by the telematics terminal, a response waiting time corresponding to the start mode;
    receiving, by the telematics terminal, an operation result of the start signal through the in-vehicle network during the response waiting time; and
    transmitting, by the telematics terminal, the operation result over the wireless communication network,
    wherein the start mode includes a normal start mode and a cold start mode,
    wherein a response waiting time in the cold start mode is longer than a response waiting time in the normal start mode.

2. The method according to claim 1, wherein
    the cold start mode, an in-vehicle motor is driven under a condition that a temperature in a fuel cell of in the hydrogen fuel cell vehicle is equal to or lower than a predetermined temperature, and
    in the normal start mode, the in-vehicle motor is driven under a condition that the temperature in the fuel cell exceeds the predetermined temperature.

3. The method according to claim 2, wherein the predetermined temperature is 30 degrees below zero Celsius (° C.).

4. The method according to claim 2, wherein the response waiting time in the normal start mode is 30 seconds, while the response waiting time in the cold start mode is one minute.

5. The method according to claim 1, wherein the start signal is transmitted at least twice in a predetermined cycle during the response waiting time.

6. The method according to claim 5, wherein the predetermined cycle is ranged in 10 seconds to 20 seconds.

7. The method according to claim 5, further comprising:
    determining a transmission cycle of the start signal according to the start mode.

8. The method according to claim 1, wherein a preparation time for driving a motor equipped in a vehicle differs according to the start mode.

9. The method according to claim 1, wherein the remote start command is transmitted from a telematics server coupled through the wireless communication network.

10. The method according to claim 1, wherein the start signal is transmitted from the telematics terminal into a vehicle controller through a controller area network (CAN), and the start mode is transmitted from the vehicle controller into the telematics terminal via the controller area network (CAN).

11. An apparatus for remote start control of a hydrogen fuel cell vehicle engaged with a mobile device or a network server, comprising a processing system that comprises at least one data processor and at least one computer-readable memory storing a computer program, wherein the processing system is configured, to cause the apparatus to:

receive a remote start command via a wireless communication network;

transmit a start signal corresponding to the remote start command through an in-vehicle network;

transmit a start mode in response to the start signal;

determine a response waiting time corresponding to the start mode;

receive an operation result of the start signal through the in-vehicle network during the response waiting time; and transmit the operation result over the wireless communication network, wherein the start mode includes a normal start mode and a cold start mode, wherein a response waiting time in the cold start mode is longer than a response waiting time in the normal start mode.

12. An apparatus for remote control of a hydrogen fuel cell vehicle, the apparatus comprising:

a telematics terminal for receiving a remote start command via a wireless communication network and transmitting a start signal corresponding to the remote start command through an in-vehicle network; and a vehicle controller for transmitting a start mode to the telematics terminal in response to the start signal, wherein the telematics terminal further determines a response waiting time corresponding to the start mode, receives an operating result of the start signal through the in-vehicle network during the response waiting time, and transmits the operation result over the wireless communication network, wherein the start mode includes a normal start mode and a cold start mode, wherein a response waiting time in the cold start mode is longer than a response waiting time in the normal start mode.

13. The apparatus according to claim 12, wherein the cold start mode, an in-vehicle motor is driven under a condition that a temperature in a fuel cell of the hydrogen fuel cell vehicle is equal to or lower than a predetermined temperature, and in the normal start mode, the in-vehicle motor is driven under a condition that the temperature in the fuel cell exceeds the predetermined temperature.

14. The apparatus according to claim 13, wherein the predetermined temperature is 30 degrees below zero Celsius (° C.).

15. The apparatus according to claim 13, wherein the response waiting time in the normal start mode is 30 seconds, while the response waiting time in the cold start mode is one minute.

16. The apparatus according to claim 12, wherein the start signal is transmitted at least twice in a predetermined cycle during the response waiting time.

17. The apparatus according to claim 16, wherein the predetermined cycle is ranged in 10 seconds to 20 seconds.

18. The apparatus according to claim 16, wherein the telematics terminal determines a transmission cycle of the start signal according to the start mode.

19. The apparatus according to claim 12, wherein a preparation time for driving a motor equipped in a vehicle differs according to the start mode.

20. The apparatus according to claim 12, wherein the start signal and the start mode are delivered via a Controller Area Network (CAN).

* * * * *